United States Patent

[11] 3,611,241

[72] Inventor Edward E. Herceg
    Lakewood, Ohio
[21] Appl. No. 11,468
[22] Filed Feb. 16, 1970
[23] Division of Ser. No. 781,872, Dec. 6, 1968, Pat. No. 3,527,099
[45] Patented Oct. 5, 1971
[73] Assignee The Weatherhead Company
    Cleveland, Ohio

[54] MOUNTING ASSEMBLY FOR PLURALITY OF STRAIN GAGES
6 Claims, 5 Drawing Figs.

[52] U.S. Cl. ........................................ 338/2,
                                        338/211, 338/315
[51] Int. Cl. ...................................... G01l 1/22
[50] Field of Search ........................... 338/2, 3, 4,
                                        6, 5; 29/610; 73/398 AR

[56] References Cited
UNITED STATES PATENTS

| | | | |
|---|---|---|---|
| 3,286,526 | 11/1966 | Mulcahy et al. | 73/398 AR X |
| 3,327,271 | 6/1967 | Hornig | 338/2 |
| 3,374,454 | 3/1968 | Holland et al. | 338/2 |
| 3,479,739 | 11/1969 | Stedman | 338/6 X |
| 2,963,773 | 12/1960 | Starr | 338/2 X |

Primary Examiner—Rodney D. Bennett, Jr.
Assistant Examiner—R. Kinberg
Attorney—McNenny, Farrington, Pearne and Gordon ABSTRACT: A temperature-compensated strain gage pressure transducer is disclosed which includes a cylindrical pressure vessel having a thin-walled pressure chamber and a solid end portion. Two active strain gages are bonded to the thin-walled chamber to measure strain resulting from fluid pressure therein, and two temperature-compensating strain gages are bonded to the unstressed solid end portion. An adhesive-coated web serves as a mounting vehicle for carrying all of the strain gages simultaneously and for positioning them on the pressure vessel in predetermined positions. The adhesive-coated web holds the strain gages in position on the pressure vessel during curing of a strain gage adhesive which bonds the strain gages to the pressure vessel, and then serves as a permanent protective blanket for the gages. The entire strain gage assembly is then encapsulated by a heat-shrinkable polyolefin tubing and assembled within a metallic protective shroud.

PATENTED OCT 5 1971 3,611,241
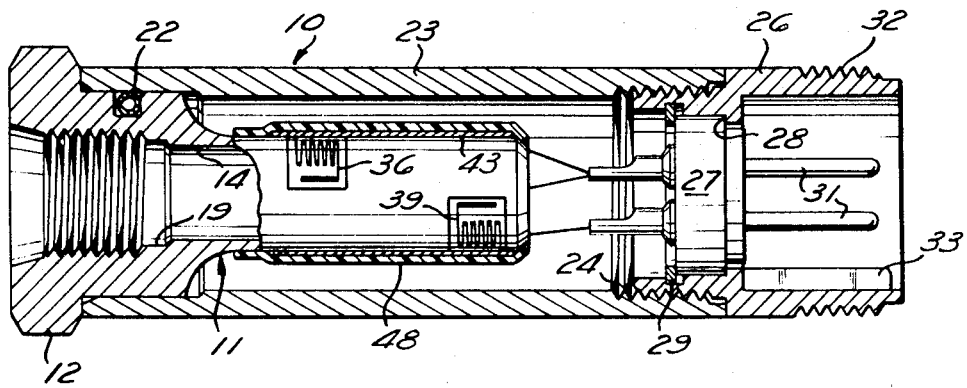
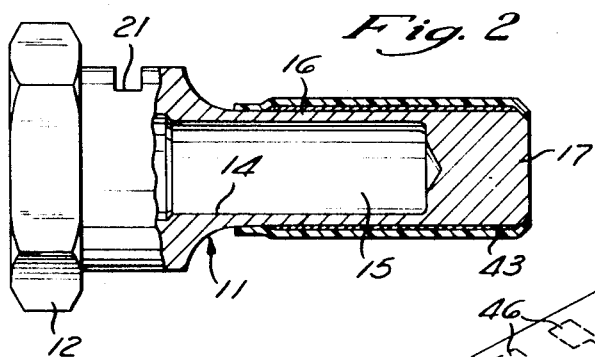
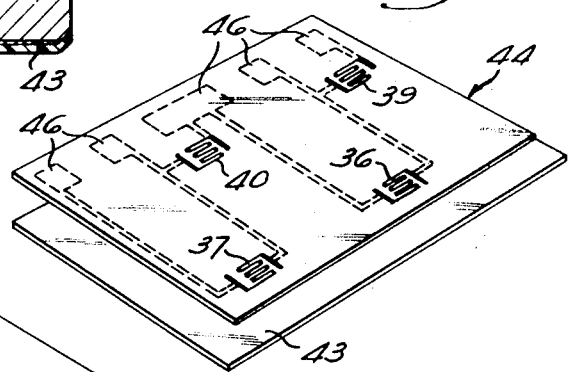
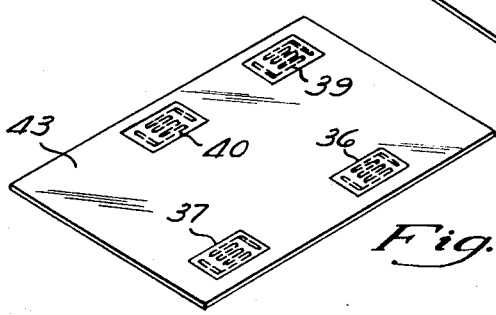
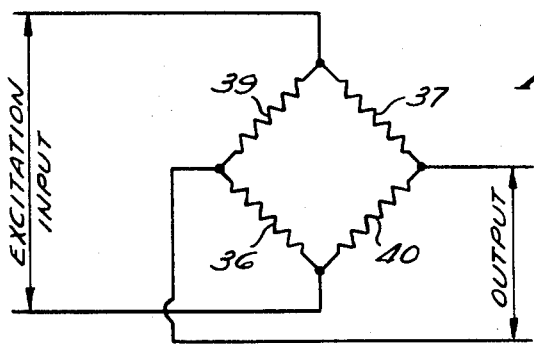
INVENTOR.
EDWARD E. HERCEG
BY McNENNY, FARRINGTON,
PEARNE & GORDON
ATTORNEYS

MOUNTING ASSEMBLY FOR PLURALITY OF STRAIN GAGES

This application is a divisional application of U.S. application Ser. No. 781,872, filed Dec. 6, 1968, now U.S. Pat. No. 3,527,099.

BACKGROUND OF THE INVENTION

This invention relates generally to strain gage instruments and, more particularly, to a mass production method and apparatus for accurately positioning strain gages on load-receiving members.

Numerous types of strain gage instruments, including fluid pressure transducers, force transducers, mechanical testing apparatus, and the like, are widely used to conveniently and accurately measure forces, bending moments, and fluid pressures.

Even though such instruments may become rather complex in specific applications, their basic principles of operation are nevertheless quite simple. Strain gage instruments include, in general, a load-receiving member which is subjected to an applied load by any desired means such as fluid pressure or a mechanical instrumentality. This applied load produces stresses and resulting strains in the load-receiving member, and these strains are measured by strain gages which are secured to the load-receiving member so that when the load-receiving member is strained, the strain gages are likewise strained. This strain in the strain gage produces a change in its electrical resistance, which may be measured and interpreted in terms of the strain in the load-receiving member by a readout unit, such as a strain indicator or oscilloscope, in a well-known manner. Knowing the strain in the load-receiving member, the magnitude of the applied force or pressure may then be easily determined.

Since the relationship between the strain in the load-receiving member and the force or pressure applied thereto is dependent upon the direction in which the strain is measured, it is imperative that the strain gage be accurately positioned on the load-receiving member so that its sensitive axis or axes extend precisely in the direction of the strain or strains to be measured. This accurate positioning of the strain gage is often quite difficult, especially on contoured surfaces, since it is usually not possible to use a mechanical positioning jig to position the strain gage (which may be quite small and delicate) and the strain gage often must be positioned by sight alone. This problem is multiplied when more than one strain gage is used, and these strain gages are to be positioned relative to one another about the load-receiving member. Furthermore, after the strain gages have been properly positioned, it is necessary to hold them in place during curing of the adhesive which bonds them to the load-receiving member.

Although these problems are quite significant even in one-time applications of strain gages, they become even more important when it is desired to mass produce strain gage instruments which are interchangeable with one another.

SUMMARY OF THE INVENTION

These and other difficulties of the prior art are overcome by the present invention, in which a method and apparatus particularly adapted to mass production usage are provided to precisely position a strain gage on a load-receiving member.

This is accomplished according to the principles of this invention by first accurately positioning the strain gages on a mounting vehicle in predetermined positions relative to the mounting vehicle and to one another. The mounting vehicle is then secured to the load-receiving member in a predetermined position so that the strain gages are precisely located in their predetermined positions on the load-receiving member. Although it may seem that this use of a mounting vehicle would compound the inaccuracies of two positioning operation, it has been found that the delicate strain gages can be easily and accurately positioned on a flat surface, such as the surface of the mounting vehicle, and further that the large mounting vehicle can easily be positioned on the load-receiving member. The mounting vehicle then serves to hold the strain gages in place during curing of a strain gage adhesive operable to bond the strain gages to the load-receiving member.

Another aspect of this invention resides in utilizing the mounting vehicle as a permanent protective blanket over the strain gages, after they have been bonded to the load-receiving member.

Still another aspect of this invention resides in providing a strain gage instrument for measuring pressures with a pressure vessel having a solid unstressed end portion so that both active strain gages and temperature-compensating strain gages can be positioned by the same mounting vehicle.

In a specific embodiment, the mounting vehicle includes a thin, flexible backing web having a pressure-sensitive adhesive coating on one side. All of the strain gages are positioned on the mounting vehicle so that they will be properly arranged on the load-receiving member when the mounting vehicle is affixed thereon in its predetermined position. The mounting vehicle is secured to the load-receiving member by the pressure-sensitive adhesive so that it holds the strain gages in their predetermined positions while the strain gage adhesive is curing and then provides a permanent protective blanket to shield the strain gages from adverse elements.

BRIEF DESCRIPTION OF THE DRAWINGS

These and other advantages of the invention will more readily become apparent to those skilled in the art upon a full and comprehensive understanding of the preferred embodiment of the invention, as shown in the accompanying drawings, wherein:

FIG. 1 is a side elevation in section of a strain gage transducer embodying the principles of this invention;

FIG. 2 is a side elevation, partly in cross section, of the load-receiving member of the transducer in FIG. 1;

FIG. 3 is a perspective view of a preferred embodiment of the mounting vehicle used to mount the strain gages in the FIG. 1 transducer;

FIG. 4 is a perspective view of another preferred embodiment of the mounting vehicle used to mount the strain gages in the FIG. 1 transducer; and FIG. 5 is a schematic circuit diagram of the four-arm Wheatstone bridge circuit of the transducer shown in FIG. 1.

DESCRIPTION OF THE PREFERRED EMBODIMENT

A strain gage instrument embodying the principles of this invention is a strain gage pressure transducer designated generally by reference numeral 10. The pressure transducer 10 includes a load-receiving member or pressure vessel 11 for being strained by an applied fluid pressure. The pressure vessel 11 is generally cylindrical and includes an enlarged head or wrench-receiving portion 12 at one end. An end bore 14 extends from the head portion 12 into but not through the vessel 11 to form a fluid pressure chamber 15 defined by a thin tubular sidewall 16 and a solid end portion 17. A threaded counterbore 19 is provided substantially adjacent the head portion 12 to threadedly connect the transducer 10 to any desired fluid fitting. The pressure vessel 11 is further provided with a lateral slot 21 to receive a retaining pin 22 which extends through a protective shroud 23 to lock the pressure vessel 11 within one end of the shroud 23.

The other end of the protective shroud 23 is provided with an internally threaded end portion 24 to threadably accept a contact carrier nipple 26. The carrier nipple 26 carries a nonconductive contact insert 27, which may be of rubber or other suitable insulating material. The contact insert 27 butts against the shoulder 28 of nipple 26 and is held in place by the retaining ring 29. The contact insert 27 carries four male contact members 31, only two of which may be seen in FIG. 1. The nipple 26 is also provided with a threaded end portion 32 to threadably receive a female contact member (not shown), and an elongated key 33 to insure proper alignment between the male and female contact members.

Two diametrically opposed, active, electrical resistance strain gages 36 and 37 are bonded to the exterior surface of the thin sidewall 16 of the fluid pressure chamber 15 in a manner that will be set forth in greater detail. The resistance strain gages 36 and 37 are preferably unidirectional, foil-type gages with a geometry such that strains along a geometrically sensitive axis produce linear resistance changes, and strains along an axis perpendicular to the sensitive axis produce no resistance changes. The resistance wires used in these strains gages 36 and 37 are chosen to have nearly the same thermal coefficient of expansion as the pressure vessel 11 so that they are not subjected to stress when there are temperature changes. The active gages 36 and 37 are precisely mounted on the thin sidewall 16 of the pressure chamber 15 so that their sensitive axes extend in the circumferential or hoop direction. This is because the hoop stress in the pressure vessel 11 is twice that of the longitudinal stress; hence, the active strain gages 36 and 37 are mounted to give the greatest sensitivity to stresses in the pressure vessel resulting from fluid pressure in the chamber 15.

Two diametrically opposed, inactive, temperature-compensating, resistance strain gages 39 and 40 are bonded to the solid end portion 17 of the pressure vessel 11 in a manner that will be set forth in greater detail. The temperature-compensating gages 39 and 40 are not subjected to strain from fluid pressure in chamber 15, since the solid end portion 17 of the vessel 11 is never stressed by fluid pressures in chamber 15 within the range of operating pressures of the transducer. These gages, therefore, are not subjected to resistance changes resulting from fluid pressure within the chamber 15, but are provided only to prevent erroneous indications of fluid pressure resulting from changes in the resistance of the active gages 36 and 37 which result from temperature changes as described more fully hereinafter. Since the gages 39 and 40 are not responsive to stresses caused by fluid pressure within the chamber 15, the sensitive axis of these gages need not be arranged in any particular direction, but may be arranged to be parallel to the sensitive axis of the active gages 36 and 37 to facilitate wiring.

The four strain gages are arranged in a four-arm Wheatstone bridge circuit, shown diagrammatically in FIG. 5. When the pressure chamber 15 is exposed to atmospheric pressure, the excitation input voltage will produce an initial reference output voltage, the value of which is dependent upon the resistances of the strain gages. If all four of the strain gages are of the same resistance, this initial reference output voltage will be zero. Then, as the fluid pressure in chamber 15 increases and the sidewall 16 is strained, the resistance of the active strain gages 36 and 37 changes. This resistance change in the two active gages produces a change in the output voltage which may be measured by any appropriate instrument, such as a strain indicator or oscilloscope, in a well-known manner. By well-known relationships, this output voltage is then related to the applied fluid pressure within chamber 15 to determine the magnitude of that pressure.

If the pressure transducer 10 were not provided with a temperature-compensating means, a change in temperature of gages 36 and 37 would result in a change of their resistance according to their temperature coefficient of resistivity. This resistance change in the active gages 36 and 37, which would not be indicative of a fluid pressure within chamber 15, would produce a change in the output voltage and result in false readings. However, by choosing temperature-compensating gages 39 and 40 to have a temperature coefficient of resistivity substantially the same as that of the active gages 36 and 37, and by locating the temperature-compensating gages in close proximity to the active gages, the thermal resistance changes in all of the four arms of the Wheatstone bridge circuit are proportional to one another, and the output voltage remains constant independently of these temperature changes.

According to the principles of the invention, the temperature-compensating gages are mounted on an unstressed portion of the same member to which the active gages are mounted. This insures that each of the gages in the four-arm bridge circuit is at substantially the same temperature, even when the temperature of the fluid within chamber 15 changes rather rapidly. Additionally, a single mounting vehicle may be employed to mount both the active and the inactive strain gages in a manner more fully described hereinafter. A further advantage of this arrangement is that the task of wiring the strain gages is simplified, since they are all conveniently mounted on the same member.

To accurately position the strain gages on the load-receiving member or pressure vessel 11 in their predetermined positions, with the sensitive axis of the active gages in precise alignment with the axis of the strain to be measured, the invention provides a mounting vehicle 43. The mounting vehicle 43 includes a flexible web for carrying all of the strain gages simultaneously and a means for securing the strain gages on the web in predetermined positions. According to the preferred embodiment, the web is provided with a thin, pressure-sensitive adhesive coating on one surface for this purpose.

In the preferred embodiment, the mounting vehicle 43 is Permacel EE 6379 pressure-sensitive "H" film, having a 1.0-mil thick DuPont "H" film backing and a high-temperature, pressure-sensitive silicone adhesive coating. This product is available from Permacel, New Brunswick, N.J. Alternatively, Mystik 7361, which has the same backing and adhesive and which is available from Mystik Div., Borden Chemical Co., Northfield, Ill., may be used. The silicone adhesive of both of these products is noncorrosive to the gage material, the backing material, and the pressure vessel.

The mounting vehicle 43 may be utilized to carry either four individual strain gages as shown in FIG. 3, or a printed circuit rosette 44 of four strain gage grid patterns as shown in FIG. 4. When individual gages are used, as in FIG. 3, the gages 36, 37, 39, and 40 are positioned on the mounting vehicle 43 is predetermined positions relative to one another and to the mounting vehicle by a vacuum fixture (not shown). The vacuum fixture includes four vacuum fingers which hold the four strain gages in a predetermined relation to one another, and which allow the mounting vehicle 43 to engage the strain gages before the vacuum is released. When the printed circuit rosette 44 of four gages is employed, the rosette 44 is applied in an offset predetermined position relative to the mounting vehicle 43 so that terminals 46 of the rosette are not covered by the mounting vehicle.

After the individual strain gages (FIG. 3) or the multigage rosette 44 (FIG. 4) have been secured to the mounting vehicle 43, the strain gage adhesive is applied uniformly to the external surface of the vessel 11 and to the back of the strain gages or rosette for bonding the strain gages or rosette thereto. In the preferred embodiment, this cement is BR–610 high-temperature, general purpose strain gage adhesive, available from William T. Bean, Inc., Detroit, Mich. Alternatively, M-Bond 610 adhesive, available from Micro-Measurements, Inc., Romulus, Mich., may be used. To position the strain gages on the vessel 11, the mounting vehicle 43 is applied to the vessel in a predetermined position relative thereto by a mechanical fixture (not shown) without necessitating direct alignment of the strain gages themselves. This mechanical fixture includes two vacuum fingers operable to grasp the two ends of the mounting vehicle 43 and a rotatable chuck operable to hold the vessel 11 in precise alignment with the vehicle 43. A roller device is operable to press the central portion of the mounting vehicle 43 against the pressure vessel 11 so that, upon slight rotation of the vessel 11 in one direction, the roller wraps a portion of the mounting vehicle 43 about the vessel 11. Rotation of the vessel 11 in the other direction then wraps the remaining portion of the mounting vehicle 43 about the vessel 11 so that the strain gages are properly aligned with each other and with the pressure vessel 11. When a rosette is used, as in FIG. 4, the mounting vehicle extends beyond two edges of the rosette to engage the vessel 11 and to overlap the opposite side of the vehicle when wrapped about the vessel.

After the strain gages have been positioned on the vessel 11 by the mounting vehicle 43, a uniform pressure is applied to the strain gages to ensure proper bonding as the strain gage adhesive cures. This uniform pressure may be applied by inserting the vessel with the gages affixed thereto into a piece of flexible tubing, and then drawing a vacuum on the tubing so that it deforms inwardly and applies a uniform pressure to the entire external surface of the mounting vehicle 43.

After the strain gages have been applied to the pressure vessel 11, the mounting vehicle 43 is not removed, but, instead, provides a permanent protective blanket to protect the gages from adverse elements.

When the rosette 44 is used, the printed circuit electrically connects the four strain gages to form three of the four connections of the bridge circuit of FIG. 5. The fourth connection (between gages 37 and 39) is made externally after the rosette assembly has been mounted on the pressure vessel 11. Since the mounting vehicle 43 does not cover the terminals 46 of the rosette 44, lead wires and the connecting wire between gages 37 and 39 may simply be soldered to the conductors 46. The interconnecting wire between gages 37 and 39 can be made of resistance material which would permit the introduction of a small resistance in series with either gage 37 or gage 39 to compensate for bridge balance variations between one assembly and another. When the individual strain gages are used, as in FIG. 3, each strain gage is provided with electrically conductive protuberances which project through the mounting vehicle 43 so that the gages can be electrically interconnected to form the bridge circuit of FIG. 5, using resistance wire where required to compensate the bridge balance.

The entire strain gage assembly is provided with a protective encapsulating tube 48. In the preferred embodiment, this encapsulating tube 48 is a dual-walled, heat-shrinkable tubing which may be manufactured from specially formulated polyolefin materials subjected to massive doses of electron beam radiation. The crosslinked outer wall of the tubing has an elastic memory which allows it to shrink without melting when exposed for a few seconds to heat in excess of 275° F., and the noncrosslinked inner wall melts during heating in excess of 275° F. and is forced into the voids of the assembly by the shrinking outer wall. Upon cooling, the entire mass becomes a rigid, tough, homogeneous molding. This material is preferably Thermofit SCL, available from Rayclad Tubes, Inc., Redwood City, Calif. It is important that the tubing 48 be heated evenly and rapidly to avoid damage to the strain gages, and the heat is preferably applied by a portable electric hot air blower, Thermogun 500A, or by a conductive heating device, Thermofit Tool 500, both of which are available from Rayclad Tubes, Inc.

The pressure vessel 11 with the encapsulated strain gage assembly is then placed within the protective shroud 23, the lead wires are connected to the contact members 31, and the carrier nipple 26 is threadably connected to the shroud 23 to complete the assembly of the transducer. The entire transducer assembly could be environmentally sealed by providing a gasket between the pressure vessel 11 and the protective shroud 23, and by using a suitably sealed plug carried member 26.

Although the principles of the present invention have been described primarily in connection with a strain gage pressure transducer, these principles are, of course, equally applicable to other strain gage instruments, such as load cells, moment arms, or structural testing apparatuses, or the like, without departing from the scope of the invention. It is recognized that various modifications and rearrangements will readily become apparent to those skilled in the art upon a full and comprehensive understanding of this invention, and may be resorted to without departing from the scope of the invention.

I claim:

1. An assembly comprising a plurality of strain-measuring gages and a mounting vehicle for precisely locating and holding said plurality of gages on a surface of a load-receiving member in predetermined arrangement with respect to each other and with respect to said surface, said mounting vehicle including carrier means simultaneously carrying said plurality of gages and holding means securing said plurality of gages to said carrier means in a predetermined position relative to said carrier and to each other, said holding means securing said carrier means to said load-receiving member in a predetermined position relative to sad load-receiving member so that said plurality of gages is located and held in said predetermined arrangement immediately adjacent said surface for permanent bonding thereto.

2. An assembly as set forth in claim 1 wherein said holding means secures said carrier means to said load-receiving member substantially permanently so that said carrier means becomes a substantially permanent protective blanket for said plurality of gages.

3. An assembly as set forth in claim 2 wherein said carrier means is a flexible web and said holding means is an adhesive coating on one surface of said flexible web.

4. A strain gage instrument comprising a load-receiving member for being strained, and a plurality of strain gages bonded to said load-receiving member for measuring the strain of said load-receiving member, said plurality of gages being positioned on said load-receiving member in a predetermined arrangement by a mounting vehicle, said mounting vehicle including a flexible backing web having an adhesive coating on one surface, said adhesive coating simultaneously carrying said plurality of gages in a predetermined position relative to said web and said adhesive coating securing said mounting vehicle to said load-receiving member in a predetermined position relative to said load-receiving member to accurately locate said plurality of gages thereon in said predetermined arrrangement and to form a permanent protective blanket over said plurality of gages.

5. A strain gage instrument as set forth in claim 4 wherein said plurality of strain gages is a plurality of strain gage grid patterns on a common carrier.

6. A strain gage instrument as set forth in claim 4 wherein said strain gage and said mounting vehicle are encapsulated by a heat-shrinkable material.